(12) United States Patent
Marks et al.

(10) Patent No.: US 7,055,484 B2
(45) Date of Patent: Jun. 6, 2006

(54) MULTIPLE FREQUENCY HELMHOLTZ RESONATOR

(75) Inventors: Patrick C. Marks, Minoa, NY (US); Thomas S. Katra, Fayetteville, NY (US)

(73) Assignee: Carrier Corporation, Syracuse, NY (US)

( * ) Notice: Subject to any disclaimer, the term of this patent is extended or adjusted under 35 U.S.C. 154(b) by 642 days.

(21) Appl. No.: 10/051,003

(22) Filed: Jan. 18, 2002

(65) Prior Publication Data

US 2003/0136119 A1     Jul. 24, 2003

(51) Int. Cl.
*F02M 35/10*     (2006.01)

(52) U.S. Cl. .......................... 123/184.57; 123/184.56; 181/214; 181/219

(58) Field of Classification Search ........... 123/184.56, 123/184.57, 184.51, 184.55; 181/214, 229, 181/219
See application file for complete search history.

(56) References Cited

U.S. PATENT DOCUMENTS

| | | | | |
|---|---|---|---|---|
| 4,538,556 A | * | 9/1985 | Takeda | 123/184.57 |
| 5,377,629 A | * | 1/1995 | Brackett et al. | 181/229 |
| 5,771,851 A | * | 6/1998 | McLean | 123/184.57 |
| 5,957,102 A | * | 9/1999 | Schorn | 123/184.57 |
| 6,009,705 A | | 1/2000 | Arnott et al. | |
| 6,105,546 A | * | 8/2000 | Fuesser et al. | 123/184.57 |
| 6,267,092 B1 | * | 7/2001 | Matsumoto et al. | 123/185.57 |
| 6,422,192 B1 | * | 7/2002 | Bloomer | 123/184.57 |
| 6,494,290 B1 | * | 12/2002 | Jessberger | 123/184.57 |
| 6,609,489 B1 | * | 8/2003 | Slopsema et al. | 123/184.57 |

FOREIGN PATENT DOCUMENTS

| | | | |
|---|---|---|---|
| JP | 58-124057 | * | 7/1983 |
| JP | 60-22021 | * | 2/1985 |
| JP | 60-95133 | * | 5/1985 |
| JP | 2-215925 | * | 8/1990 |

* cited by examiner

*Primary Examiner*—Tu M. Nguyen

(57) ABSTRACT

The tunable resonator is coupled to the engine speed control such that the resonator is set to a different frequency range when the engine speed is changed. The frequency range is changed by opening and closing necks and/or changing the effective volume of the resonator.

8 Claims, 3 Drawing Sheets

MULTIPLE FREQUENCY HELMHOLTZ RESONATOR

BACKGROUND OF THE INVENTION

Diesel engines used to drive transport refrigeration equipment produce low frequency tones at their firing frequencies and their harmonics. The refrigeration units can be required to hold the load temperature within 0.1F.° of the set point which may be 40° F. for flowers or produce and −20° F. for ice cream. A number of these units can be parked and running at cold storage warehouses, interstate highway rest stops, etc. Because these units can be running at various loadings and because the engine speeds of the units are operator adjustable by a couple of percent, the noise outputs will be at different frequencies, but may be relatively coherent such that the various different frequency noise sources cyclically go into and out of phase. As the noise sources go from reinforcing to opposing the other noise sources, there is a perceived varying of the sound level. These tones can be sources of annoyance in the community adjacent areas where a number of units are running.

U.S. Pat. No. 6,009,705 discloses a noise attenuator employing a plurality of quarter wave resonator tubes and Helmholtz resonators. Each will be tuned to a separate narrow frequency range. The effectiveness of the various resonators will drop off as the frequencies of the noise sources vary from the design frequencies as the engine speed/load changes.

SUMMARY OF THE INVENTION

A transport refrigeration unit is, typically, driven by a diesel engine. As is conventional for internal combustion engines, ambient air is drawn through a filter into the cylinders of the engine. The present invention modifies either the volume or the neck area of a Helmholtz resonator to change the frequency range to which the resonator is responsive. In a Helmholtz resonator you have a chamber/volume configured as a dead end side branch to a duct and connected to the duct by a passage/neck that is substantially smaller in cross section. All of the dimensions must be small compared to a wavelength such that the system operates in the "lumped parameter" region, i.e. no wave effects. The gas in the chamber can act as a gas spring, and the slug of gas in the neck acts as a lumped mass, and you have a simple first order spring-mass system with a natural frequency. If that natural frequency coincides with a pulsation frequency in the duct, then it will be driven in resonance, with the slug of gas in the neck bouncing back and forth on the gas spring in such a manner as to be out of phase with the wave in the duct and thus tends to cancel the pulsation in the same manner as a side branch resonator. The frequency response can be changed by: (1) changing the volume (smaller=higher frequency); (2) changing the length of the neck (shorter=higher frequency); or (3) changing the diameter or total cross section of the neck(s) (smaller area=lower frequency). Changes can be made in combination, and the "neck" can, in fact, be several necks in parallel. In a first embodiment, a butterfly, flapper or other suitable valve is located inside the resonator and can be positioned to isolate or communicate a portion of the resonator volume with the rest of the resonator volume thereby changing the effective volume of the resonator. At low speed, the valve would be open and the larger volume would be used. At high speed, the valve would be closed and the smaller volume would result in a resonator responsive to higher frequencies. In a second embodiment, the volume is connected to the inlet pipe through a plurality of pipes or "necks" all but one of which would be valved to change the open area which has a direct effect on the resonant frequency of the volume. At low speed, only the unvalved neck would provide communication between the inlet pipe and the volume. At high speed, the resonant frequency would be increased by opening the valves to increase the neck area. The first and second embodiments can be combined to be responsive to four resonant frequencies.

It is an object of this invention to eliminate the need for a resonator for each frequency of interest at both high and low speed operation.

It is another object of this invention to provide a resonator effective in two frequency ranges. These objects, and others as will become apparent hereinafter, are accomplished by the present invention.

Basically, the tunable resonator is coupled to the engine speed control such that the resonator is set to a different frequency range when the engine speed is changed. The frequency range is changed by opening and closing necks and/or changing the effective volume of the resonator.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
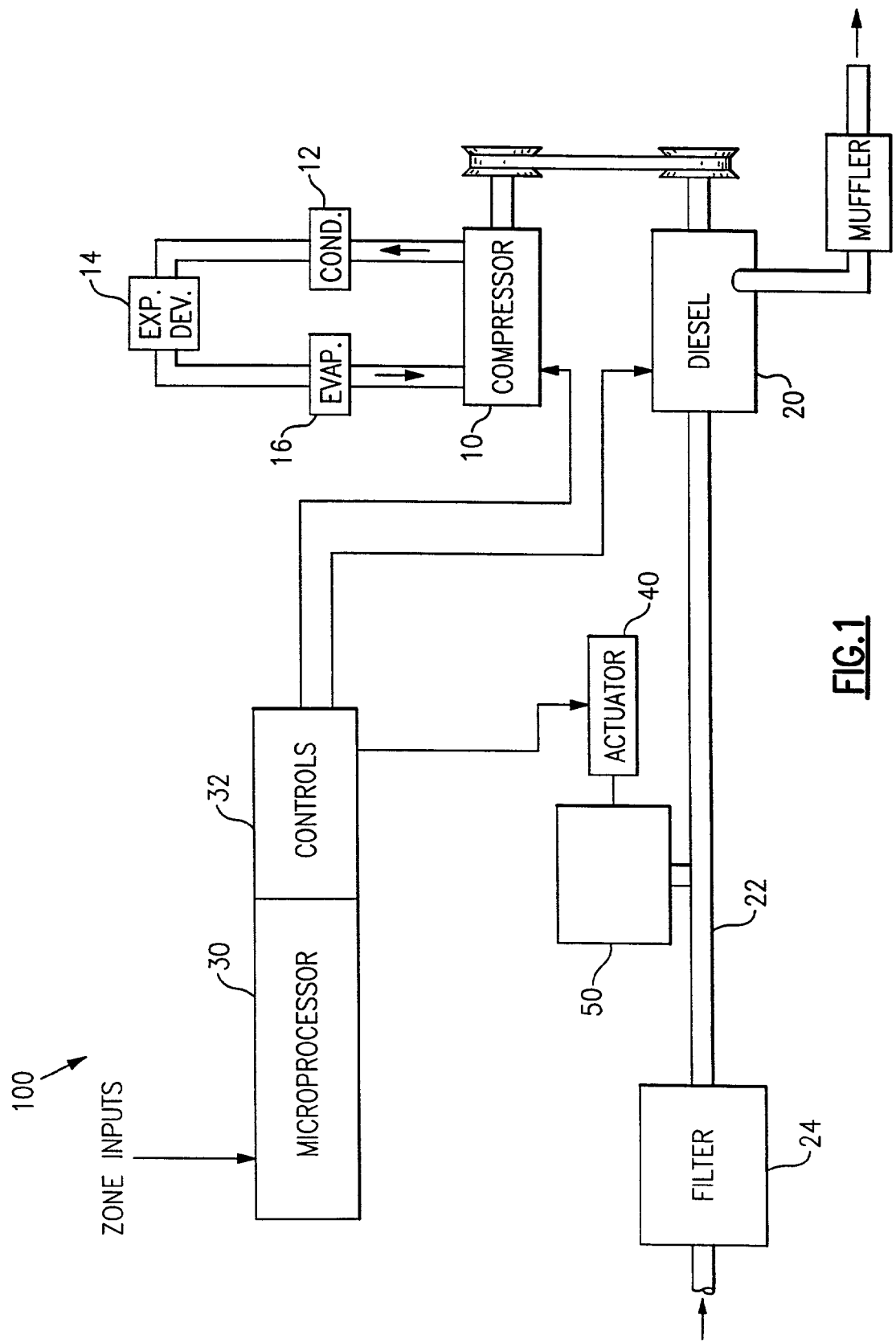
FIG. 1 is a schematic representation of the present invention as used with a diesel engine driven refrigeration system.

In FIG. 1, the numeral 100 generally designates a transport refrigeration system. Refrigeration compressor 10 is driven by a multi-speed diesel engine 20. Compressor 10 is in a refrigeration circuit serially including condenser 12, expansion device 14 and evaporator 16. Refrigeration system 100 is controlled by microprocessor 30 which receives a number of inputs such as the engine speed, the sensed ambient temperature, condenser entering air temperature, zone temperature, and zone set point which are collectively labeled as zone inputs. In operation, diesel engine 20 and compressor 10 are driven though controls 32 responsive to microprocessor 30. Specifically, diesel engine 20 may be driven through a speed control solenoid and draw ambient air into its cylinders via inlet line 22 containing filter 24.

The present invention changes the frequency range to which a Helmholtz resonator is responsive by varying the effective volume of the resonator, or varying the neck area or a combination of both. Although the term "valve" is used, there is no fluid flow past the valve since the resonator is a closed chamber whose only connection with the inlet pipe is through the open neck(s). Structurally, however, the valve structure corresponds to a conventional butterfly or flapper valve.

Figure 2:
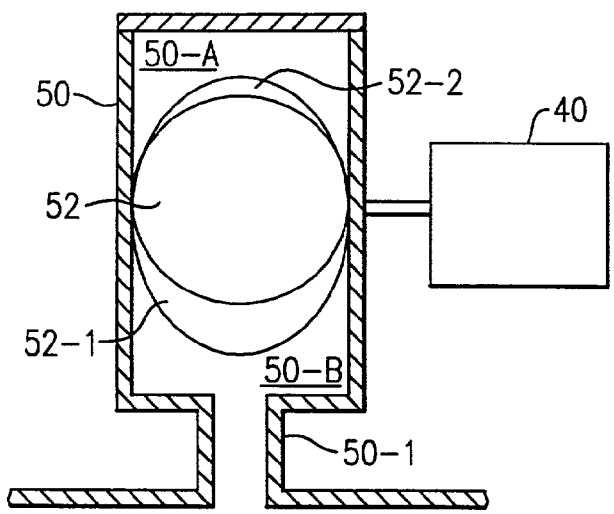
FIG. 2 is a sectional view of the multiple frequency Helmholtz resonator of FIG. 1 with the valve in the open position.
Figure 3:
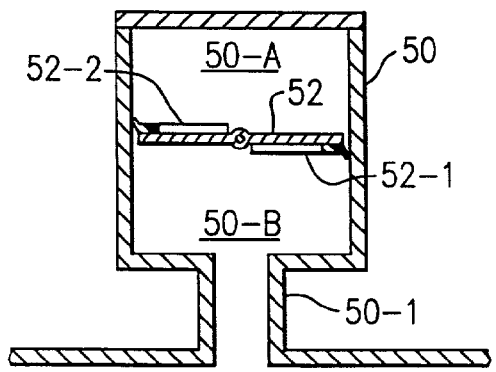
FIG. 3 is a sectional view of the resonator of FIG. 2, rotated 90° with respect to FIG. 2 and showing the valve in the closed position.

Referring specifically to FIGS. 2 and 3, valve 52 is specifically illustrated as a flapper valve. Although valve 52 appears to be circular, and to have the same nominal dimension as the interior of Helmholtz resonator 50, it will have a slightly greater dimension in the direction perpendicular to the axis of rotation than along the axis of rotation. The purpose of the non-circular configuration is to ensure a positive seating since the valve 52 will be in an interference fit with the interior walls of the Helmholtz resonator 50. The interference can be from the valve itself and/or wiper lips 52-1 and 52-2 of a suitable material such as neoprene. If necessary, or desired, valve 52 could engage a seat located in resonator 50.

In resonator 50, flapper valve 52 divides resonator 50 into chamber 50-A and chamber 50-B when valve 52 is closed, as illustrated in FIG. 3. Chamber 50-B is always in communication with inlet pipe 22 via neck 50-1. Valve 52 is driven by actuator 40 which is coupled to controls 32. At low speed, valve 52 is the open position of FIG. 2 and sound energy from diesel 20 enters the resonator cavity defined by chambers 50-A and 50-B and, for a frequency defined by its internal geometry, is reflected back to the engine 20 and cancels pulsations at the designated frequency. At high speed, valve 52 is closed so that only chamber 50-B receives sound energy from diesel 20, and, for a frequency defined by the modified internal geometry, is reflected back to the engine 20 and cancels pulsations at the designated frequency.

Figure 4:
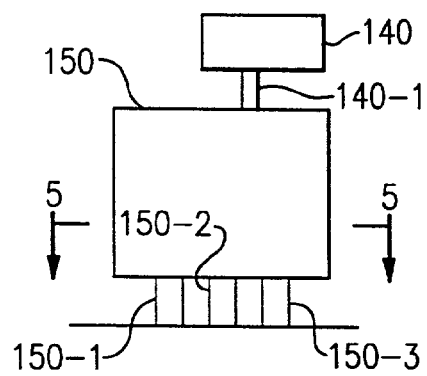
FIG. 4 is a view of a modified multiple frequency Helmholtz resonator.
Figure 5:
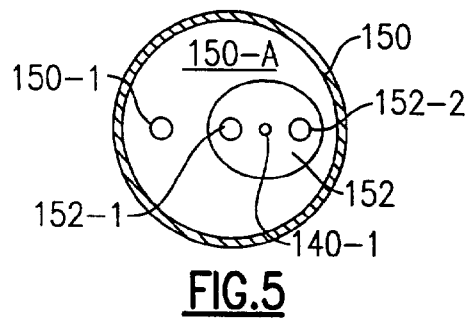
FIG. 5 is a sectional view taken along line 5—5 of FIG. 4 showing the valve in the open position.
Figure 6:
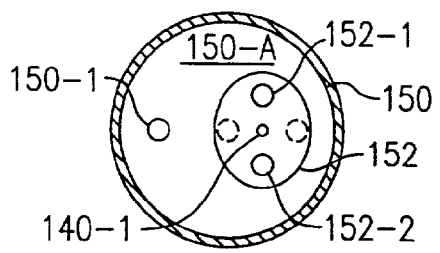
FIG. 6 is a sectional view corresponding to FIG. 5 but showing the valve in the closed position.

In the embodiment of FIGS. 4–6, Helmholtz resonator 150 has a chamber 150-A of fixed volume which is connected to inlet line 122 via one, or more, of necks 150-1 through 150-3. Neck 150-1 is always connected to chamber 150-A. Necks 150-2 and 150-3 have valved communication with chamber 150-A. Valve 152 is connected via shaft 140-1 to actuator 140 and, as illustrated, is a disk which has a pair of diametrically spaced ports 152-1 and 152-2. Valve 152 is moved by actuator 140 between the positions of FIGS. 5 and 6. Although FIGS. 5 and 6 show valve 150 rotated 90° between its two positions, it is only necessary to rotate valve 150 a sufficient amount to bring ports 152-1 and 152-2 into and out of registration with necks 150-2 and 150-3, respectively. In the FIG. 5 position, ports 152-1 and 152-2 are in register with necks 150-2 and 150-3, respectively, and chamber 150-A is connected to inlet line 122 via necks 150-1, 150-2 and 150-3 and resonator 150 is responsive to higher frequencies. In the FIG. 6 position, ports 152-1, and 152-2 are out of register with necks 150-2 and 150-3, respectively, and chamber 150-A is connected to inlet line 122 only via neck 150-1 and resonator 150 is responsive to lower frequencies.

Figure 7:
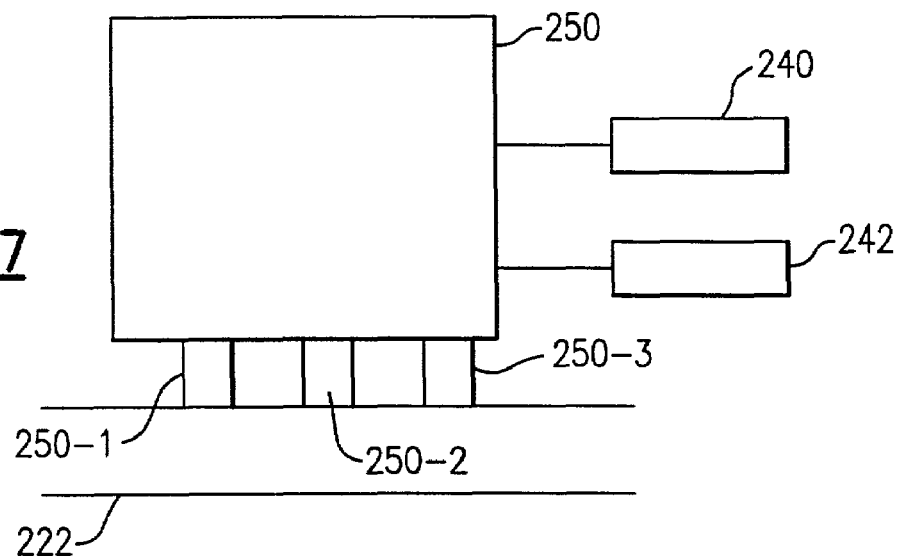
FIG. 7 is a view of a second modified multiple frequency Helmholtz resonator.
Figure 8:
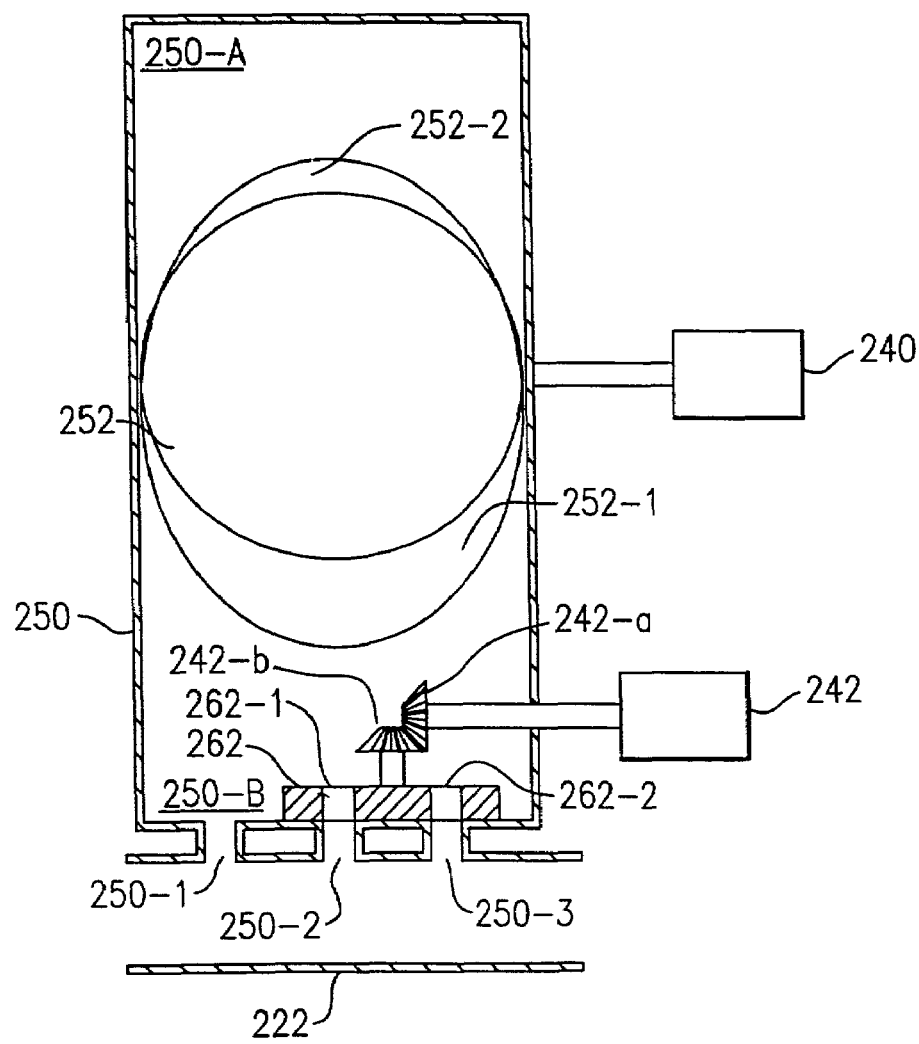
FIG. 8 is a sectional view of the FIG. 7 device showing both valves in the open position.

In the embodiments of FIGS. 1–3 and FIGS. 4–6 each of the resonators is responsive to two frequencies. The embodiment of FIGS. 7 and 8 combines the embodiment of FIGS. 1–3 with that of FIGS. 4–6. Flapper valve 252 corresponds to valve 52 and has wiper lips 252-1 and 252-2 and divides resonator 250 into chamber 250-A and 250-B when valve 252 is closed. Chamber 250-B is always in communication with inlet pipe 222 via neck 250-1. Valve 252 is driven by actuator 240 which is coupled to controls 32 and microprocessor 30 and driven thereby. Chamber 250-B is connected to inlet line 222 via one, or more of necks 250-1, 250-2 and 250-3. As noted, neck 250-1 is always connected to chamber 250-B. Necks 2502 and 250-3 have valved communication with chamber 250-B. Valve 262 coacts with necks 250-2 and 250-3 to permit or block communication with chamber 250-B via necks 250-2 and 250-3. Valve 262 corresponds to valve 152 except for being driven by actuator 242 via bevel gears 242-a and 242-b. Valve 262 has ports 262-1 and 2622 which are moved into and out of register with necks 250-2 and 250-3, respectively. Actuator 242 is coupled to controls 32 and microprocessor 30 and driven thereby. By opening and closing valve 252, two frequency responses are possible. By opening and closing valve 262 two frequency responses are available for a total of four frequency responses by the resonator 250.

From the point of view of acoustics, the system does not have to be tightly sealed as long as the leakage areas are very small compared to the active areas. As an inlet silencer, as illustrated, resonator 50 is located between filter 24 and diesel 20, thus it must be tight enough to prevent dirt leaking in and entering the engine 20 having bypassed filter 24. Typically o-ring type sealing for the actuator structure should be sufficient. Resonator 50 and valve 52 would be made of a material, such as steel or molded plastic, so as to provide a rigid wall of sound reflection.

Although specific embodiments have been described and illustrated, other changes will occur to those skilled in the art. It is therefore intended that the present invention is to be limited only by the scope of the appended claims.

What is claimed is:

1. In a system having a multi-speed engine with an air inlet line connected to said engine, a Helmholtz resonator structure comprising:

a closed chamber configured as a single dead end side branch connected to said line and defining a Helmholtz resonator continuously operatively connected to said inlet line via an always open restricted connection;

means for attenuating noise in a plurality of frequencies by changing the frequency response of said Helmholtz resonator responsive to changes in speed of said engine;

said means for attenuating noise in a plurality of frequencies by changing the frequency response includes at least one restricted connection which is selectively connected between said chamber and said inlet line.

2. The Helmholtz resonator of claim 1 wherein said means for attenuating noise in a plurality of frequencies by changing the frequency response further includes means for effectively changing the volume of said closed chamber connected to said inlet line via said restricted connections.

3. A refrigeration system having a multi-speed engine with an inlet line connected to said engine, microprocessor means for controlling the speed of said engine, the improvement comprising:

a closed chamber configured as a single dead end side branch connected to said line and defining a Helmholtz resonator continuously operatively connected to said inlet line via an always open restricted connection;

means for attenuating noise in a plurality of frequencies by changing the frequency response of said Helmholtz resonator responsive to changes in speed of said engine;

said means for attenuating noise in a plurality of frequencies by changing the frequency response includes at least one restricted connection which is selectively connected between said chamber and said inlet line.

4. The Helmholtz resonator of claim 3 wherein said means for attenuating noise in a plurality of frequencies by changing the frequency response further includes means for effectively changing the volume of said closed chamber connected to said inlet line via said restricted connections.

5. A refrigeration system having a multi-speed engine with an inlet line connected to said engine, microprocessor means for controlling the speed of said engine, the improvement comprising:

a closed chamber configured as a single dead end side branch connected to said line and defining a Helmholtz resonator continuously operatively connected to said inlet line via an always open restricted connection;

means for attenuating noise in a plurality of frequencies by changing the frequency response of said Helmholtz resonator responsive to changes in speed of said engine; and said means for attenuating noise in a plurality of frequencies by changing the frequency response includes a valve having only an open and a closed position.

6. The Helmholtz resonator of claim 5 wherein said means for attenuating noise in a plurality of frequencies by changing the frequency response includes means for effectively changing the volume of said closed chamber connected to said inlet line.

7. The Helmholtz resonator of claim 5 wherein said means for attenuating noise in a plurality of frequencies by changing the frequency response includes at least one restricted connection which is selectively connected between said chamber and said inlet line.

8. The Helmholtz resonator of claim 7 wherein said means for attenuating noise in a plurality of frequencies by changing the frequency response further includes means for effectively changing the volume of said closed chamber connected to said inlet line via said restricted connections.

* * * * *